(12) United States Patent
Haubmann et al.

(10) Patent No.: US 10,996,546 B2
(45) Date of Patent: May 4, 2021

(54) SUPPORT ROD FOR AN ACCESSORY COMPONENT OF A MOTION PICTURE CAMERA

(71) Applicant: Arnold & Richter Cine Technik GmbH & Co. Betriebs KG, Munich (DE)

(72) Inventors: Michael Haubmann, Vienna (AT); Christian Tschida, Vienna (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 14 days.

(21) Appl. No.: 16/111,367

(22) Filed: Aug. 24, 2018

(65) Prior Publication Data
US 2019/0064639 A1 Feb. 28, 2019

(30) Foreign Application Priority Data
Aug. 25, 2017 (DE) .......................... 102017119532.7

(51) Int. Cl.
*G03B 17/56* (2021.01)
*G03B 17/12* (2021.01)
*G03B 19/18* (2021.01)

(52) U.S. Cl.
CPC .......... *G03B 17/561* (2013.01); *G03B 17/12* (2013.01); *G03B 17/56* (2013.01); *G03B 17/563* (2013.01); *G03B 19/18* (2013.01); *G03B 2217/002* (2013.01); *G03B 2217/007* (2013.01)

(58) Field of Classification Search
CPC ....................................................... F21V 21/35
See application file for complete search history.

(56) References Cited

U.S. PATENT DOCUMENTS

| 4,272,177 | A | * | 6/1981 | Ottenheimer | ........... F16M 11/08 396/423 |
| 4,699,484 | A | | 10/1987 | Howell et al. | |
| 4,943,821 | A | | 7/1990 | Gelphman et al. | |
| 7,575,324 | B2 | * | 8/2009 | Elias | ..................... G03B 17/561 224/908 |
| 8,620,152 | B1 | * | 12/2013 | Martin | ................... G02B 15/10 248/121 |
| 9,025,003 | B2 | | 5/2015 | Tao | |
| 2008/0087784 | A1 | * | 4/2008 | Holmberg | .............. F16M 13/00 248/309.1 |
| 2013/0061504 | A1 | * | 3/2013 | Malherbe | .............. F41G 11/003 42/84 |
| 2013/0327913 | A1 | * | 12/2013 | Fruhm | ................... F16M 11/08 248/349.1 |

(Continued)

FOREIGN PATENT DOCUMENTS

CN 102346360 A 2/2012
DE 40 18 414 A1 12/1991

(Continued)

*Primary Examiner* — Noam Reisner
(74) *Attorney, Agent, or Firm* — Amster, Rothstein & Ebenstein LLP

(57) ABSTRACT

A support rod for holding an accessory component relative to a motion picture camera in a variable position along a longitudinal axis of the support rod has at least one outwardly open recess. The support rod has a set back contact region in the recess that is accessible from the outside for the electrical contacting of the accessory component.

32 Claims, 16 Drawing Sheets

(56) References Cited

U.S. PATENT DOCUMENTS

Figure 1:
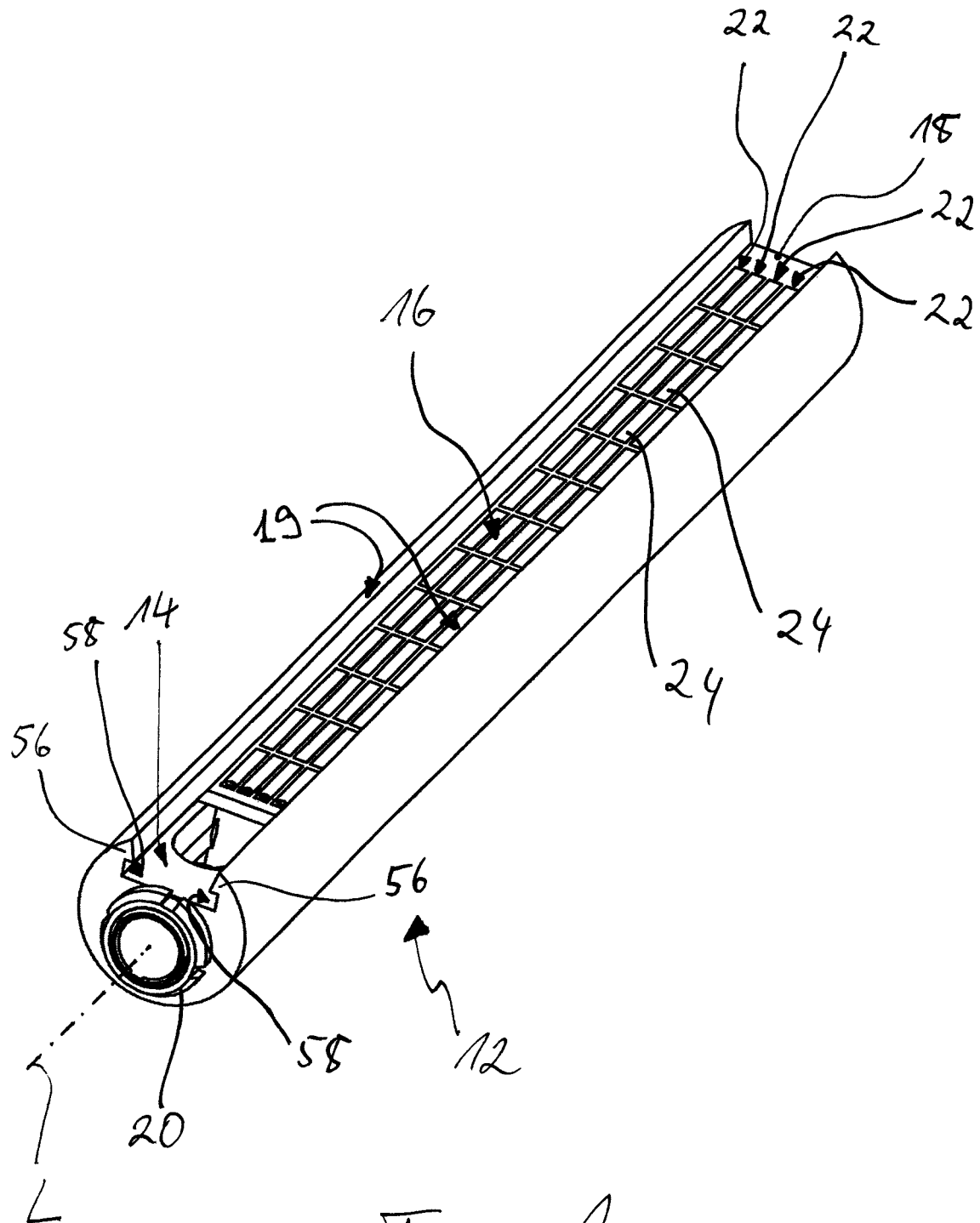

2014/0373420 A1* 12/2014 Harris .................. F41G 11/003
                                                            42/84
2015/0131983 A1    5/2015 Thayer et al.
2015/0241166 A1*  8/2015 Hines ...................... F41C 23/22
                                                            42/75.02
2017/0153533 A1    6/2017 Apter

FOREIGN PATENT DOCUMENTS

| DE | 202 14 250 U1 | 9/2003 |
|---|---|---|
| DE | 10 2004 015 947 A1 | 10/2005 |
| DE | 20 2009 003 069 U1 | 7/2009 |
| DE | 20 2012 012 442 U1 | 2/2013 |
| DE | 20 2012 012 509 U1 | 3/2013 |
| DE | 10 2012 007 474 A1 | 10/2013 |
| EP | 0574105 A1 | 12/1993 |
| EP | 2174175 B1 | 5/2012 |
| EP | 2722584 A2 | 4/2014 |
| WO | 2016/160042 A1 | 10/2016 |

* cited by examiner

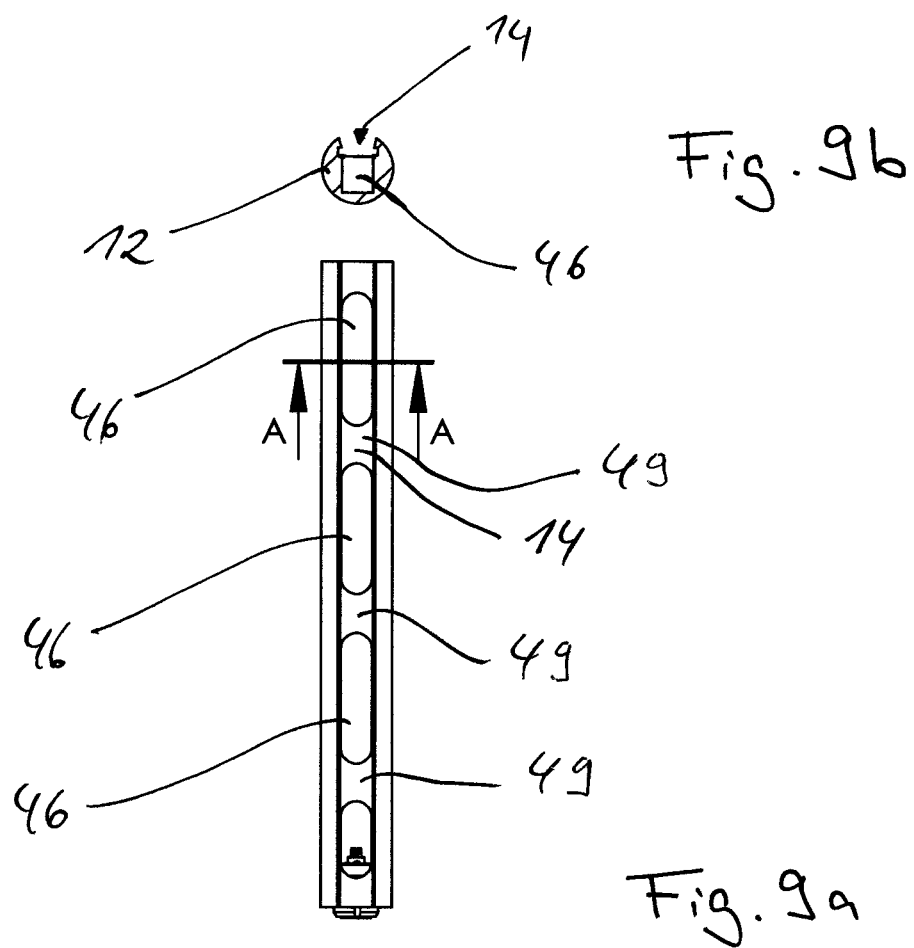

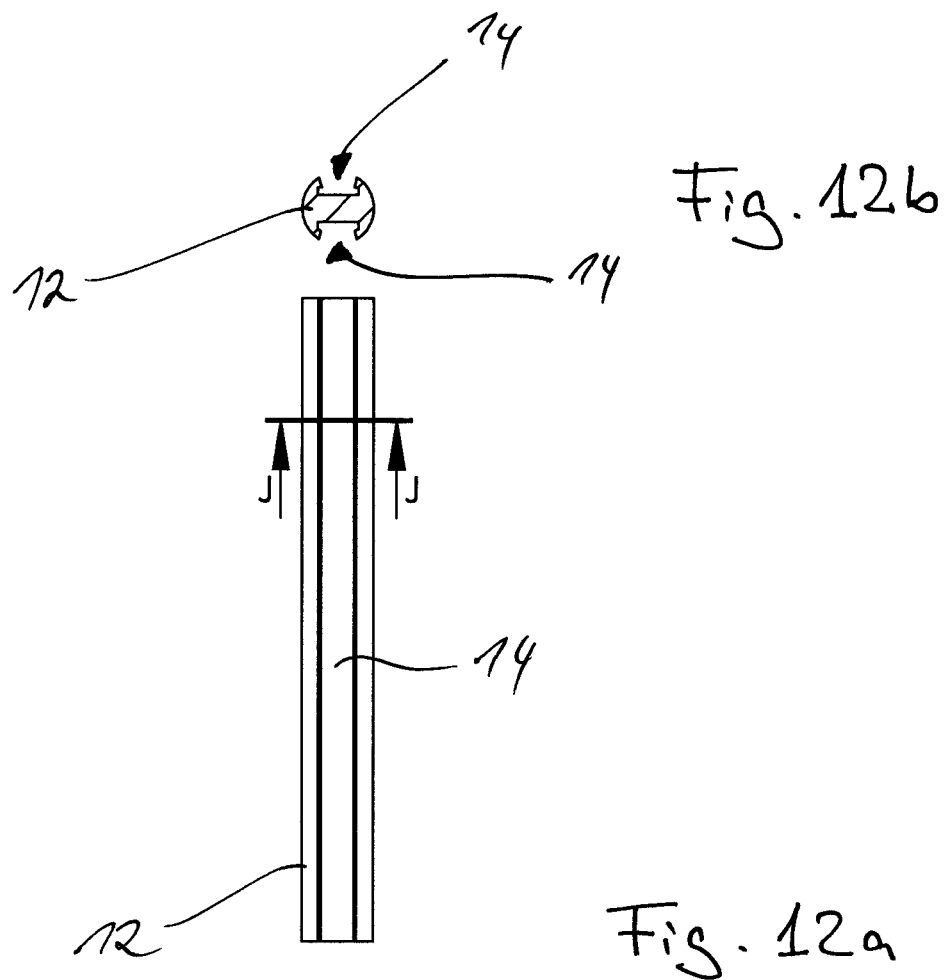

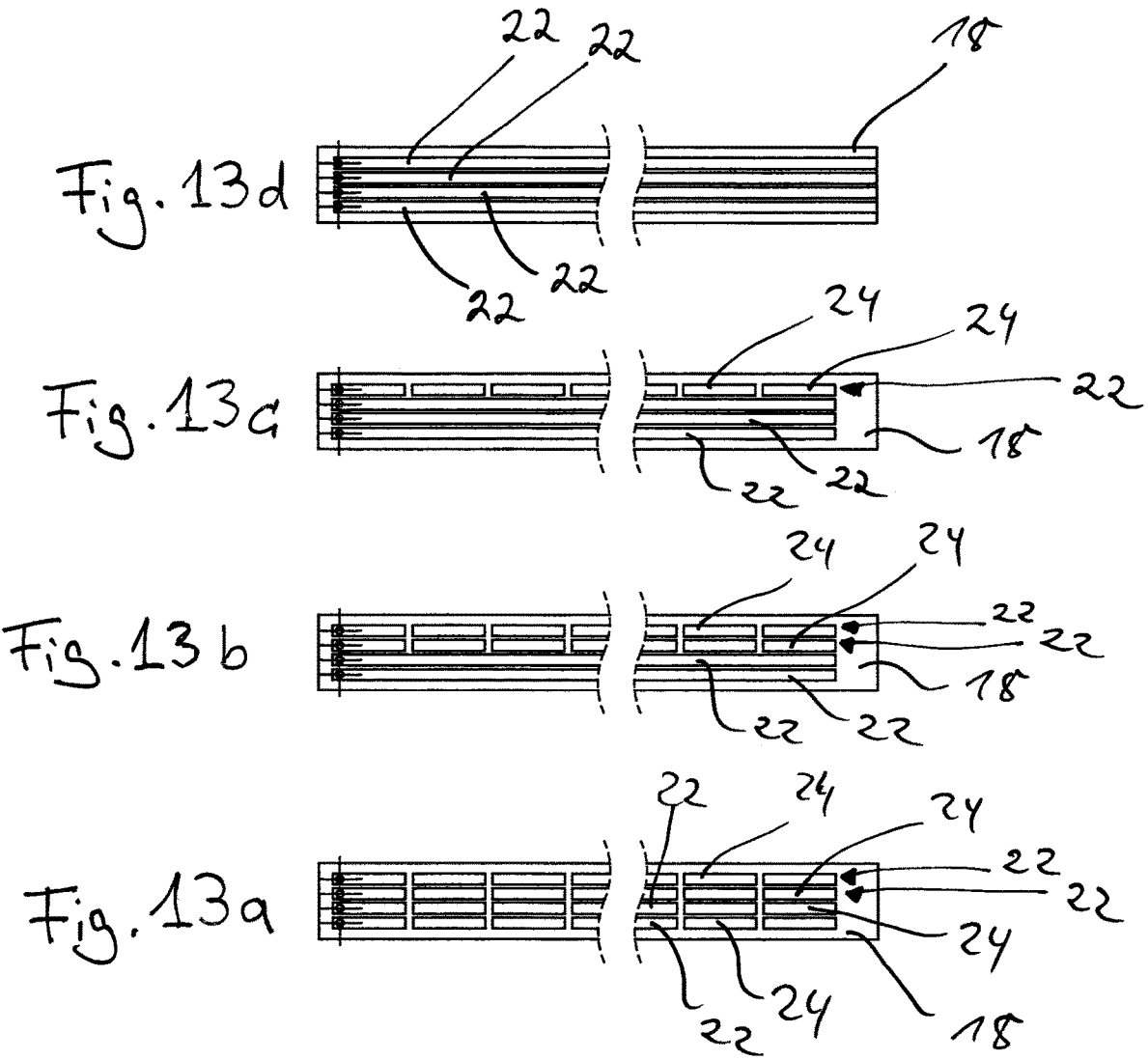

SUPPORT ROD FOR AN ACCESSORY COMPONENT OF A MOTION PICTURE CAMERA

The present invention relates to a support rod for holding an accessory component relative to a motion picture camera in a variable position along a longitudinal axis of the support rod. The accessory component can, for example, be fixedly fastened to the support rod by means of a clamping device. The position of the accessory component along the longitudinal axis of the support rod can be fixed here such that the accessory component can act in a desired manner and can in particular cooperate with the motion picture camera. The support rod can e.g. be integrated pair-wise into a support system of the motion picture camera, with a plurality of accessory components being able to be fastened to the support rod. A support system having two support rods and one fastening device (bridge) to fasten the two support rods to a motion picture camera is known from U.S. Pat. No. 7,575,324 B2.

The accessory component can in particular be a setting motor for an objective ring (e.g. a focus ring or an aperture ring) or for a filter unit (e.g. different ND (neutral density) filters). The accessory component can furthermore be a radio module for a wireless data transmission (e.g. of setting data and/or image data), a ring light source, or a monitor for displaying data. Accessory components of the motion picture camera thus serve for the operation of the motion picture camera, with the camera being able to be expanded or upgraded relative to a base functionality. The motion picture camera can be a conventional motion picture camera (recording on photochemical film) or an electronic motion picture camera (recording of digital image data on an electronic storage medium).

In the case of an electrically operated accessory component, the electrical supply and/or the connection to the motion picture camera via flexible, electrically insulated conductors, i.e. via (supply) cables. The use of cables, that are in particular to be provided in a higher number when there is a plurality of accessory components, is, however, associated with problems. Cables thus require space in the environment of the accessory component and block the view. Cables furthermore contain the danger that the user or an article becomes caught at it. The cable can furthermore release in an unwanted manner and can result in a failure of the respective accessory component that can have the consequence of unwanted down times of the motion picture camera. A further problem comprises the fact that the variable positioning of the accessory component is limited by the cable length, with the cable either sagging or being tensioned in dependence on the position of the accessory component.

It is an object of the invention to provide a support rod of the initially named kind in which said problems have been eliminated. The use of cables should in particular be largely dispensed with. Furthermore, a variable positioning capability and a reliable operation of the accessory component should be ensured.

The object is satisfied by a support rod that has at least one outwardly open recess, with the support rod having a set back contact region in the recess that is accessible from the outside for the electric contacting of the accessory.

The accessory component can have a suitable current collector that engages into the recess of the support rod and electrically contacts the contact region when the accessory component is mechanically fastened to the support rod. The accessory component can in this manner simply and reliably be electrically supplied or coupled. A laborious supply by means of cables and defect-prone electrical plug-in connections is no longer necessary. The accessory component can furthermore be variably positioned in dependence on the recess.

The invention is based on the recognition that one or more electrical supply lines for one or more accessory components of the motion picture camera can advantageously be integrated into the support rod that is anyway provided to hold the respective accessory component relative to the motion picture camera. The support rod thus combines mechanical and electrical purposes and represents an innovative electromechanical device that makes the use of cables largely superfluous for the coupling of accessory components to a motion picture camera and ensures a more reliable and safer operation of accessory components, as will be explained more exactly in the following.

Due to the fact that the contact region is set back in the recess, the contact region is protected from unwanted electrical contacts with other components or elements of the motion picture camera. The risk of an unwanted contact of the contact region by an operator of the motion picture camera is in particular reduced. The length, width, and depth of the recess are preferably dimensioned such that a contact of the contact region, in particular by an operator can practically be precluded. The contact region is preferably at least electrically insulated from the outer surface of the support rod so that the support rod does not have any exposed regions that could result in an electrical short circuit.

The electrical contacting of the accessory component via the contact region can serve for the electrical energy supply of the accessory component and/or for the electrical signal transmission (e.g. control signals, data) from and/or to the accessory component.

The support rod is preferably configured to be fastened to a conventional fastening bridge (typically called a "bridge plate"). In particular a pair-wise arrangement of two support rods next to one another can be provided, with either only one or both of the two support rods being able to be equipped with the recess and the electrical contact region provided therein.

Alternatively, the support rod can also be configured for fastening in a different configuration and/or position at or relative to the motion picture camera, for example to a cage surrounding the motion picture camera, in particular to hold a different kind of accessory component, e.g. a display or a distance measuring device.

The support rod can be formed by a solid rod, by a hollow tube, or by a tube having an internal structure, with the recess being formed at the rod or at the tube. The support rod preferably extends linearly (in a straight line), i.e. not curved. A hollow tube having an internal structure can be formed, for example, such that at least one connection web is provided between two inner peripheral sections of the hollow tube. Such a tube having an internal structure can be manufactured by an extrusion process, for instance. It is understood that the support rod does not have to be formed as only solid or hollow along the longitudinal axis. The structure of the support rod can thus be variable along the longitudinal axis. The solid rod can, for example, be sectionally milled open to reduce the weight of the support rod and/or to improve the mechanical properties of the support rod.

The support rod can be formed from suitable materials, for instance from a metal (e.g. steel) or from a light metal (e.g. aluminum). The support rod does not have to be electrically conductive. Flexurally rigid plastics, in particular carbon and the like, can thus also be considered. Mixed forms are also conceivable, e.g. in the form of a hollow metal tube which is slit in the longitudinal direction and in which one or more inserts, e.g. formed from plastic, have been introduced for mechanical stabilization.

The support rod preferably has an at least substantially circular cross-section that is constant along the longitudinal axis of the support rod over the total length or sectionally. The cross-section can be fully circular with the exception of the recess. A circular cross-section offers particular advantages with respect to the stability of the support rod and the fastening of the accessory component. The accessory component can thus advantageously be fastened to the support rod having a circular cross-section by means of a clamping apparatus. The cross-section of the support rod does not, however, to be strictly circular. In particular oval or polygonal, e.g. quadrangular, hexagonal, or octagonal, cross-sections are conceivable. The cross-section that is constant in the longitudinal direction is sensible with respect to a free positioning capability of the accessory component. However, this can be deviated from. The support rod can, for example, only be provided with a circular cross-section sectionally to define discrete fastening positions for the accessory component. The cross-section, in particular the diameter, of the support rod can furthermore differ sectionally to ensure a compatibility with different accessory components and/or support systems and/or fastening plates. The cross-section preferably has a smooth extent in the peripheral direction and/or in the longitudinal direction. Disruptive sharp edges are avoided in this manner and the mechanical properties of the support rod are not disadvantageously influenced.

In accordance with a preferred embodiment, the recess is elongate and extends along the longitudinal axis of the support rod. The recess can form a groove. The accessory component can thus at least be freely positioned along the elongate recess and can simultaneously be electrically provided via a current collector engaging into the recess. The recess is preferably so narrow that an unwanted contacting of the contact region is practically precluded. The groove can have a width of less than 1 cm, preferably of less than 0.5 cm, for this purpose.

The recess can in particular be formed by a substantially T-shaped groove. A particularly narrow transition region (corresponding to the middle bar of the "T" shape) can be provided between the contact region and the outer environment of the support rod in this manner, whereby the risk of unwanted electrical contacts is further reduced. The contact region can, however, be wider than this transition region so that a current collector of the accessory component engaging into the recess can contact the contact region reliably and without canting. A contact board can furthermore be securely held in the recess by the T-shaped groove.

In accordance with a further embodiment, the support rod has two outwardly open recesses at different peripheral sections, with the support rod having a set back contact region in each of the two recesses which is accessible from the outside for the electrical contacting of the accessory component. The accessory component can thus be fastened to the support rod at different angular positions in dependence on the recesses. A plurality of recesses are in particular advantageous when a plurality of accessory components having respective fixed current collectors are to be mounted at different angular positions at the same support rod. Accessory components are also conceivable having two respective separate current collectors that each engage into an associated recess of the support rod and contact a respective contact region. The recesses can be formed a two mutually diametrically opposed peripheral sections of the support rod (i.e. peripheral sections offset by a peripheral angle of 180° with respect to one another). The contact region of the first recess can be provided or the positive pole and the contact region of the second recess can be provided for the negative pole of an electrical supply of the accessory component. Using one of the two recesses exclusively for a data transmission is also conceivable.

In accordance with a preferred embodiment, at least one contact board at which the contact region is formed is arranged in the recess—in each recess in the case of a plurality of recesses. The contact board can be manufactured as a separate element independently of the support rod and can be placed into the recess. The manufacture of the support rod is thus substantially simplified, with the contact board being able to be simply replaced in the event of a defect occurring later. It is, however, also conceivable to form the contact region integrally at the support rod, e.g. at an at least sectionally electrically conductive base of the recess. In addition to the contact region, i.e. to the required means for the electrical contacting, the respective contact board can also have a control circuit and/or a sensor system as will be explained in the following. Such a control circuit and/or sensor system can be arranged at a lower side of the respective contact board, for example, with respect to the contact region.

The term "contact board" is to be understood broadly in connection with the invention and does not only comprise a so-called printed circuit board (PCB), but also any support device that defines the position of said contact region within the recess of the support rod and that has at least one electrical terminal.

The recess of the support rod can at least sectionally have at least one undercut along the longitudinal axis of the support rod, with the contact board being captured between a base of the recess and the undercut. The contact board can in this manner be fixed in the recess in addition or alternatively to an adhesive connection. The contact board thus also remains in a desired position if an adhesive connection were to fail e.g. after a long service life. The contact board can be guided by two grooves disposed opposite one another in the recess, with the contact board being able to be pushed into the recess in the longitudinal direction.

In accordance with a further embodiment, the recess is bounded along the longitudinal axis of the support rod, in particularly solely, by side surfaces that are inclined relative to the plane of extent of the contact board and that face outwardly. The inclined side surfaces can promote a low-friction guidance of a current collector of the accessory component engaging into the recess and can thus serve as an introduction aid. The risk of a canting of a current collector is furthermore in particular reduced in such cases in which the current collector does not engage into the recess exactly perpendicular to the plane of extent of the contact board.

The features described above for the case of one recess can be implemented in a corresponding manner with a plurality of recesses, in particular with all the provided recesses.

The contact board can have an electrical terminal for connecting the contact board to a control circuit. The control circuit can be integrated into the support rod or can be provided externally therefrom. Electrical terminals can furthermore be provided to connect the contact board to electrical supply devices or to other control devices. In accordance with an alternative embodiment, the control circuit can, however, also be provided at the respective contact board or at one of a plurality of contact boards.

In accordance with a further embodiment, the support rod is formed as at least sectionally hollow beneath a base of the recess. In addition to a weight reduction of the support rod, an excessive heating of the contact board can hereby also be counteracted.

Possible embodiments of the contact region will be described by way of example in the following.

In accordance with an embodiment, the contact region comprises a plurality of mutually adjacent contact tracks that extend along the longitudinal axis of the support rod and that are electrically insulated from one another. Each contact track can thus be made use of independently of other contact tracks for the electrical supply of an accessory component fastened to the support rod. Individual contact tracks or a plurality of contact tracks can naturally serve for the supply of individual accessory components or for the common supply of a plurality of accessory components. A contact track can be provided both for a voltage supply and for data transmission. It is understood that not all of the plurality of contact tracks have to simultaneously be connected to an electrical supply. Provision can, for example, be made that the contact tracks can be selectively electrically switched, i.e. activated.

In accordance with an embodiment, at least one of the plurality of contact tracks can extend at least substantially over the total length of the support rod. It is also possible that all of the plurality of contact tracks extend at least substantially over the total length of the support rod. The contact tracks can in particular form a respective bus line as will be explained in the following.

The contact region can be divided into a plurality of contact sections that are electrically insulated from one another along the longitudinal axis of the support rod in accordance with an alternative embodiment. The contact sections can, like the contact tracks, be used independently of one another, that is they can be selectively switched electrically active or inactive. The contact sections of the contact region can be distributed in accordance with a pattern, in particular in a regular arrangement. The division along the longitudinal axis of the support rod can in particular relate to one or more of said contact tracks. The contact region can thus in particular have one or more contact tracks that are correspondingly divided into contact sections such as will be explained below.

In accordance with a further embodiment, the support rod comprises a sensor system for detecting the presence and/or the position and/or an identification feature of an accessory component held by the support rod. A presence detection and/or a position detection can in particular be used for a selective release or activation of individual contact tracks or contact sections. One or more identification features (e.g. kind or type of the accessory component or serial number) can serve for the identification of a specific accessory component, whereby e.g. a specific control of the accessory component can be made possible. The operation of a motion picture camera can furthermore be automatically adapted in dependence on an identified accessory component. The sensor system can be connected to a control circuit associated with the support rod for this purpose.

The sensor system can have at least one sensor that comprises a Hall sensor, a reed switch, an electrical contact switch, a mechanical contact switch and/or a radio frequency receiver. The radio frequency receiver can in particular be an RFID (radio frequency identification) reader, e.g. based on the NFC (near field communication) standard. The sensor can in particular be provided to detect a magnetic field of a permanent magnet of the accessory component, a mechanical actuation by the accessory component, an electrical connection to the accessory component and/or a response signal of a passive radio frequency receiver (e.g. of an RFID transponder) of the accessory component and/or the control signal of an active radio frequency transmitter of the accessory component. The electrical connection of the accessory component to the motion picture camera can take place fully automatically in this manner and can thus be particularly comfortable and failsafe for the user. A manual connection or installation of the accessory component that would require special knowledge of the user is not required.

In accordance with a further embodiment, the contact region is—as already explained—divided along the longitudinal axis of the support rod into a plurality of contact sections that are electrically insulated from one another, with the support rod having at least one control circuit that is configured to selectively activate at least one of the plurality of contact sections for an electrical energy supply of the accessory component and/or for an electrical signal transmission from or to the accessory component in dependence on the detected presence and/or position and/or on the detected identification feature of the accessory component held by the support rod. In other words, the control circuit can be configured to switch individual contact sections electrically active, in particular for the duration of the reception of the signal of the sensor system or for a predefined duration in dependence on a signal that is generated by said sensor system and that is transmitted to the control circuit.

The control circuit can, for example, be configured to detect an electrical contact between a contact section and a contact receiver of an accessory component and, in the case of a detection, to electrically supply the accessory component via the detected contact section. Other contact sections that are not required for an electrical supply of an accessory component can in particular be deactivated for safety reasons. The contact sections can, as mentioned, above, be distributed in accordance with a pattern, in particular in a regular arrangement. The pattern can in particular be configured such that an unintentional contacting of a contact section activated by an accessory component is practically precluded due to the size of the accessory component. In other words, the length of individual contact sections can e.g. be adapted to the size of a current collector and/or of the accessory component itself. It is further understood that the contact region can in particular have one or more contact tracks that are correspondingly divided into contact sections along the longitudinal axis of the support rod.

A (central) control circuit can be provided for a plurality of contact sections, in particular for all of the plurality of contact sections, for the selective activation of individual contact sections or a respective separate (decentralized) control circuit can be provided for each individual contact section. A respective control circuit does not, however, have to be an element of the support rod. The control circuit can rather also be an external device, e.g. as a part of the control unit of the motion picture camera.

In accordance with a further embodiment, the support rod has at least one electrical bus line that extends continuously along the plurality of contact sections to supply the plurality of contact sections with electrical energy and/or to transmit electrical signals from and to the plurality of contact sections. The supply of the contact sections can thus be effected particularly efficiently. The bus line can preferably be formed and/or arranged in a manner covered toward the outside. The bus line can in particular be provided at the lower side of said contact board.

The support rod preferably has at least one electrical interface for connecting the contact region to an electrical energy source and/or to an external communication device. The interface can be an electrical plug-in connector, for example. The support rod can thus easily be retrofitted in already existing systems, with the support rod being able to be electrically connected, for example, to an accumulator and/or to a control unit of the motion picture camera. The interface can also be integrated into a terminal of the support rod.

In accordance with a further embodiment, the contact region comprises a contact track that extends, as already explained, along the longitudinal axis of the support rod, with the contact track forming a first electrical connector for an electrical energy supply of the accessory component and/or for an electrical signal transmission from or to the accessory component.

The contact track of a further support rod that is in another respect of the same type can form a second electrical terminal for the electrical energy supply of the accessory component and/or for the electrical signal transmission from or to the accessory component in a support system comprising at least two support rods. In other words, two support rods can each comprise an electrical terminal for the accessory component that is formed by a respective contact track, with the accessory component being at least electrically connected to both support rods. The two terminals can, for example, form a positive pole and a negative pole of an electrical voltage supply. Since the terminals in this case have been provided at separate support rods, the risk of a short circuit between the terminals can be minimized. The association of the terminals with the electrical poles can be facilitated for a user by e.g. a mechanical code of the respective support rods.

As an alternative or as a supplement to two support rods having a respective electrical terminal, the individual support rod can itself be electrically conductive (in particular at an outer surface), with the support rod (or its outer surface) forming a second electrical terminal for the electrical energy supply of the accessory component and/or for the electrical signal transmission from or to the accessory component. The support rod can, for example, serve as an electrical ground connection, whereby a separate ground line can be saved.

Both the contact track of an individual support rod and the contact track of a further support rod of the same type can be divided into a plurality of electrically mutually insulated contact sections along the longitudinal axis of the respective support rod and can be selectively activatable as described above. With respect to the above-described sensor system, it can be restricted to one support rod in the case of two support rods contributing to the electrical supply, with e.g. the position detected at a support rod being able to be used for releasing or activating the contact sections of both support rods depending on the detected position. Only one sensor system and one detection procedure are therefore required to release the relevant contact sections of the two support rods by means of one or more switching devices.

In accordance with a preferred embodiment, the contact region comprises at least one first contact track and one second contact track that extend along the longitudinal axis of the support rod. In this embodiment, two or more (e.g. three or four) contact tracks that are electrically insulated from one another can be arranged within a common recess and can be contacted there by a multi-polar current collector of an accessory component. The second contact track preferably extends next to the first contact track. The first contact track can form a first electrical terminal and the second contact track can form a second electrical terminal for an electrical energy supply of the accessory component and/or for an electrical signal transmission from or to the accessory component. The first contact track and/or the second contact track can be divided into a plurality of contact sections that are electrically insulated from one another along the longitudinal axis of the support rod. As described above, a selective activation of individual contact sections can take place by means of a sensor system and by means of a control circuit.

A particularly simple design having a full functional extent and a small risk of an electrical short circuit results, for example, when the first contact track extends continuously along the longitudinal axis of the support rod to form a first electrical terminal for an electrical energy supply of the accessory component and/or for an electrical signal transmission from or to the accessory component and, when the second contact track is divided into a plurality of contact sections that are electrically insulated from one another along the longitudinal axis, can be selectively activated by means of a control circuit to form a second electrical terminal for an electrical energy supply of the accessory component and/or for an electrical signal transmission from or to the accessory component. A supply line that is disposed in a covered manner can here be provided for the plurality of contact sections, for example in the form of said bus line at the lower side of said contact board.

In accordance with a further embodiment, the support rod has, as already explained, a first recess having a first contact region at a first peripheral region and a second recess having a second contact region at a second peripheral region, with the first contact region forming a first electrical terminal and the second contact region forming a second electrical terminal for an electrical energy supply of the accessory component and/or for an electrical signal transmission from or to the accessory component. A local separation of two electrical terminals can thus be implemented at a single support rod. The two electrical terminals can in particular be provided diametrically opposite. The first contact region and/or the second contact region can be divided into a plurality of contact sections that are electrically insulated from one another along the longitudinal axis of the support rod. As described above, a selective activation of individual contact sections can take place by means of a sensor system and by means of a control circuit.

Where a control track, a contact region or the support rod should itself form an electrical terminal in connection with the invention, this it to be understood such that the respective contact track, the contact region, or the support rod is configured to be connected to an associated electrical potential to enable an energy supply and/or a signal transmission, with the physical coupling not having to take place directly at the respective contact track, at the contact region, or at the support rod, but rather with an indirect coupling also being possible (e.g. via a plug-in connector or another electrical interface).

In accordance with a further embodiment, the support rod has a plurality of outwardly open recesses along its longitudinal axis. The plurality of recesses can be provided behind one another along the longitudinal axis in the same angular orientation at the support rod. The support rod in each of the plurality of recesses can have a respective set back contact region that is accessible from the outside for the electrical contacting of an accessory component. The respective contact region can in particular comprise one contact track or at least two (e.g. two, three, or four) contact tracks extending next to one another. The plurality of recesses or contact regions can be distributed in accordance with a pattern, in particular in a regular arrangement along the longitudinal axis and in alignment with one another. A respective recess can here define an installation position for an accessory component. This can be sensible to avoid incorrect installations e.g. when an accessory component should only be fastened to one position determined by the respective recess due to the construction. The recess can in this case simultaneously represent a mechanical code for the user so that he can fasten a respective accessory component to the support rod particularly fast and free of error. A plurality of such rows of recesses, for example two, can also be provided that are arranged at different angular orientations relative to one another, i.e. at different peripheral sections of the support rod.

It is in particular conceivable in the case of a plurality of recesses that they are formed as different from one another. The different recesses can in particular be adapted only to be compatible with respective associated accessory components, in particular with an associated current collector. A specific kind of accessory components can, for example, only be installable in the region of an associated recess.

The support rod can be configured to be mechanically and electrically coupled to further support rods of the same kind. For example, the support rod can be extended by further support rods to adapt the length of the support rod to e.g. a motion picture camera and/or to a support system of the motion picture camera. Extensible support rods are also conceivable.

The invention also relates to a support system that comprises at least two support rods and one fastening device or fastening the two support rods to a motion picture camera, with at least one of the two support rods being configured in accordance with one of the above-described embodiments. The fastening device can be designed as a plate separate from the motion picture camera or can be integrated into the motion picture camera.

As already explained, with such a support system, one element (e.g. a contact region) of the one support rod can form a first electrical terminal for the electrical energy supply of the accessory component and/or for the electrical signal transmission from or to the accessory component and one element (for example a contact region) of the other support rod can form a second electrical terminal.

The above-described control circuit for activating contact sections can be a part of said support system. In such an embodiment, the at least one support rod of the support system can comprise a sensor system for detecting the presence and/or the position and/or an identification feature of an accessory component held by the support rod, with the contact region of the at least one support rod being divided into a plurality of contact sections that are electrically insulated from one another along the longitudinal axis of the support rod, and with the support system having at least one control circuit that is configured to selectively activate at least one of the plurality of contact sections for an electrical energy supply of the accessory component and/or for an electrical signal transmission from or to the accessory component in dependence on a detected presence and/or position and/or on a detected identification feature of the accessory component held by the support rod.

The invention further relates to an accessory component for a motion picture camera having a fastening device that is configured to fasten the accessory component in a variable position along a longitudinal axis of a support rod and having an electrical current collector that is configured to engage into a recess of the support rod to electrically contact a contact region located in the recess. The accessory component can in particular be adapted to a support rod in accordance with any one of the above-explained embodiments. The current collector is preferably at least dipolar. A monopolar variant is e.g. conceivable when the support rod (in particular an outer surface thereof) forms a second electrical terminal and the accessory component is electrically connected to the support rod. The current collector is preferably equipped with a plurality of poles whose arrangement is adapted to the contact region, in particular to the arrangement of contact tracks and/or contact sections. The current collector can, for example, have four contact pins that contact four adjacent contact tracks and/or contact sections.

Figure 2:
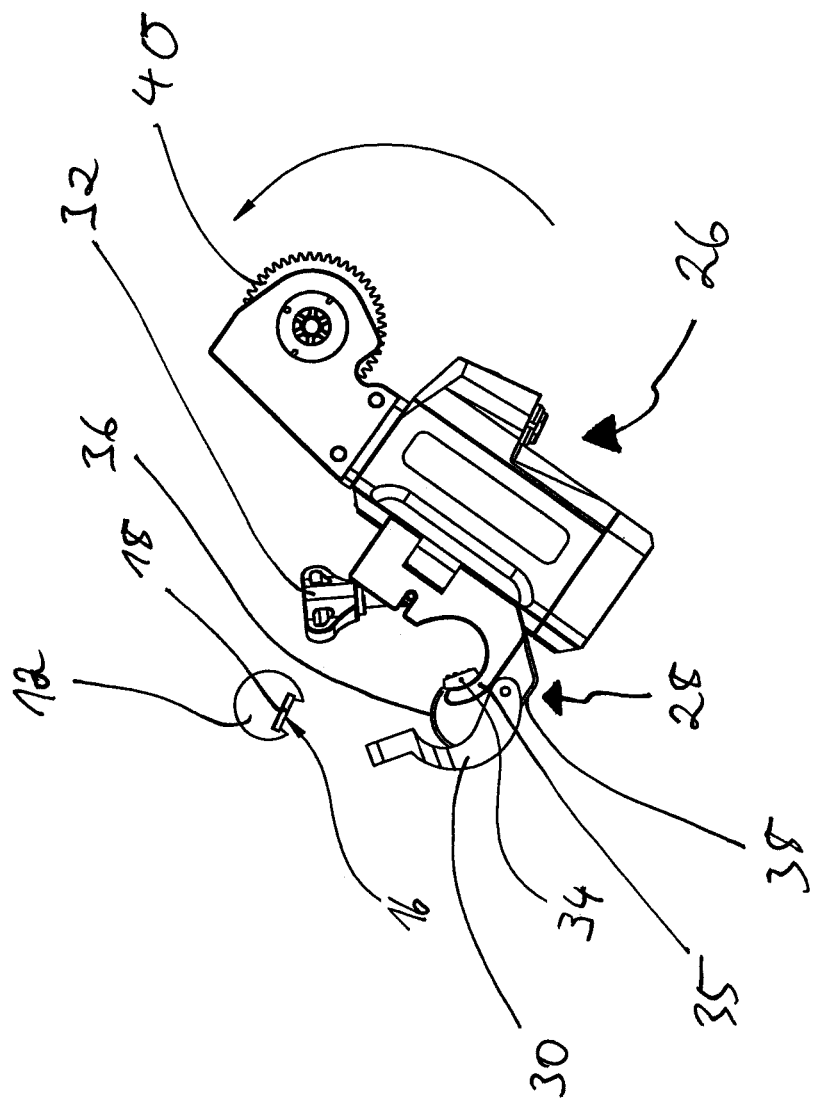
Figure 3:
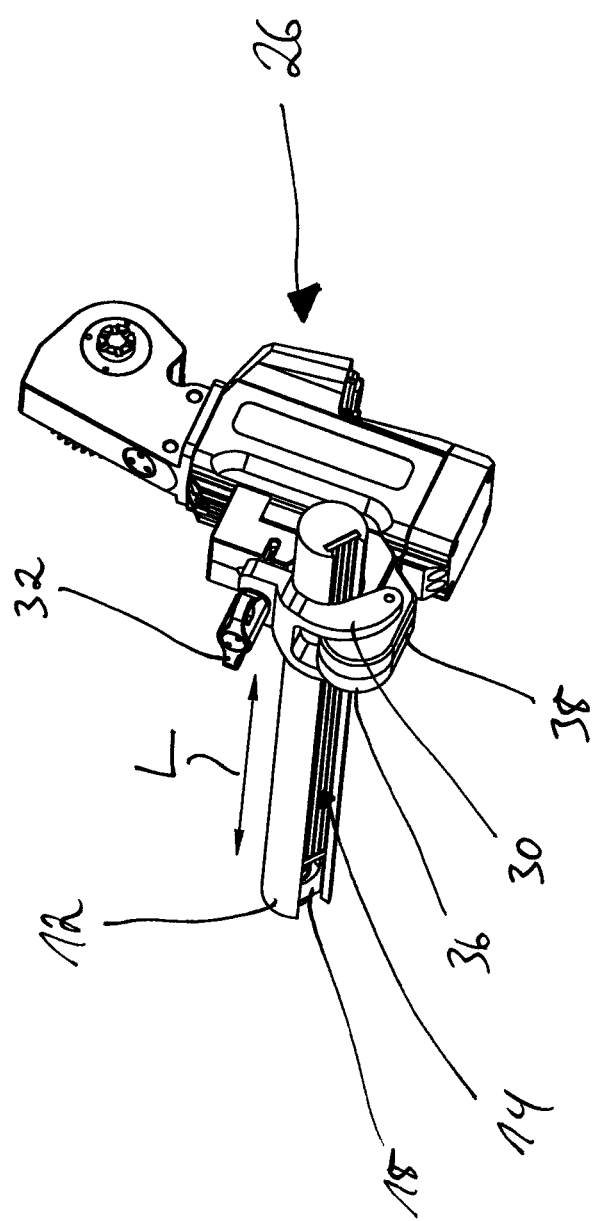
Figure 4:
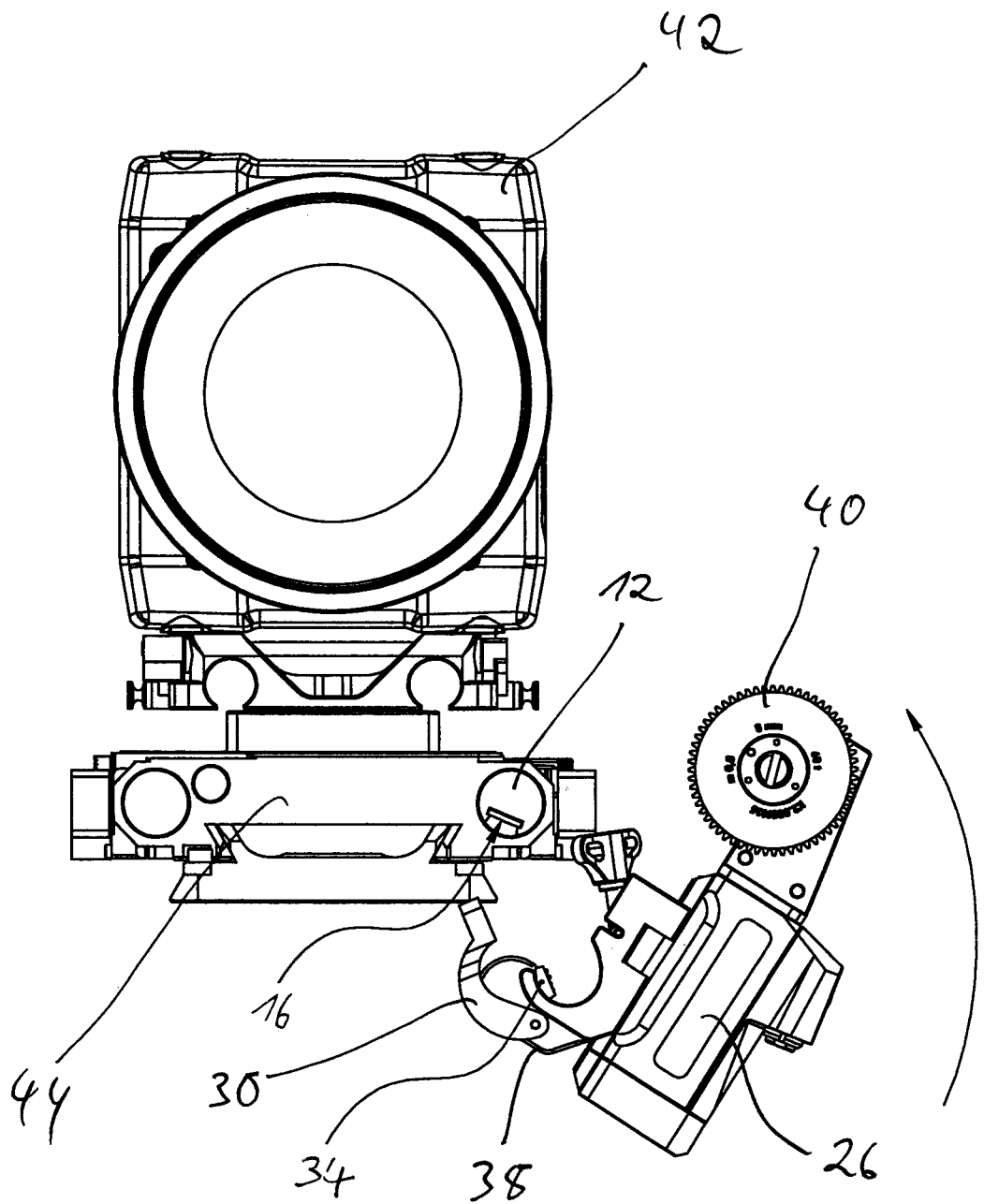
Figure 5:
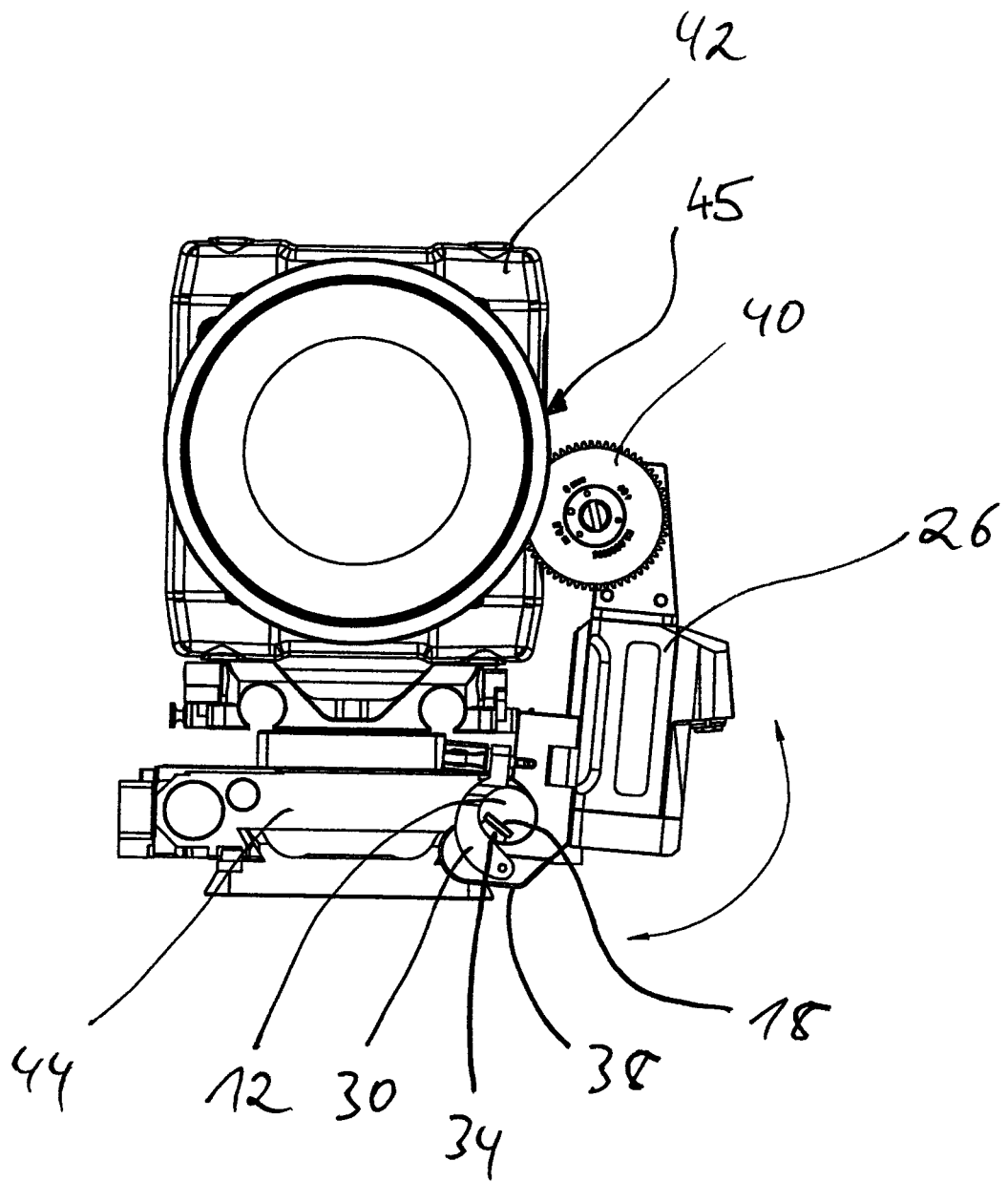
Figure 6:
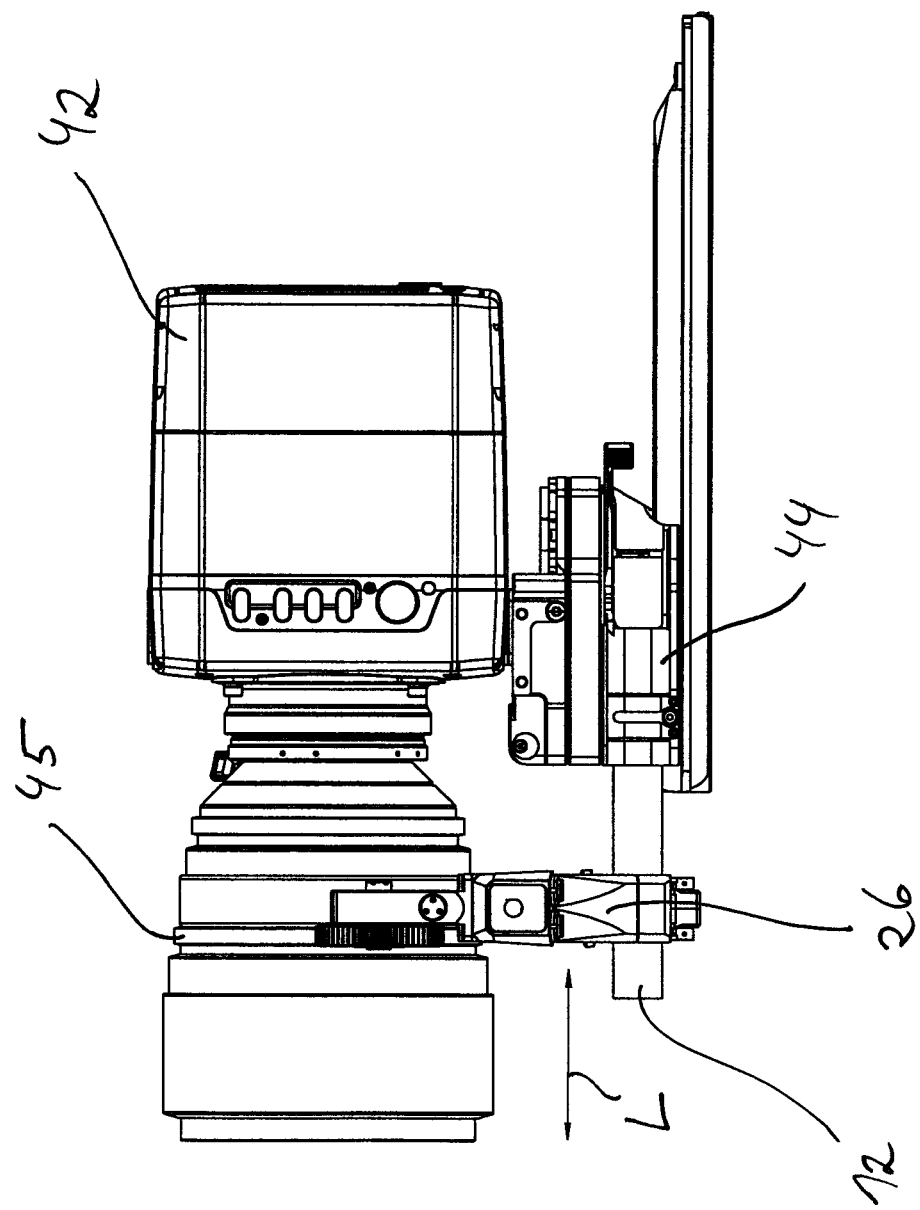
Figure 7:
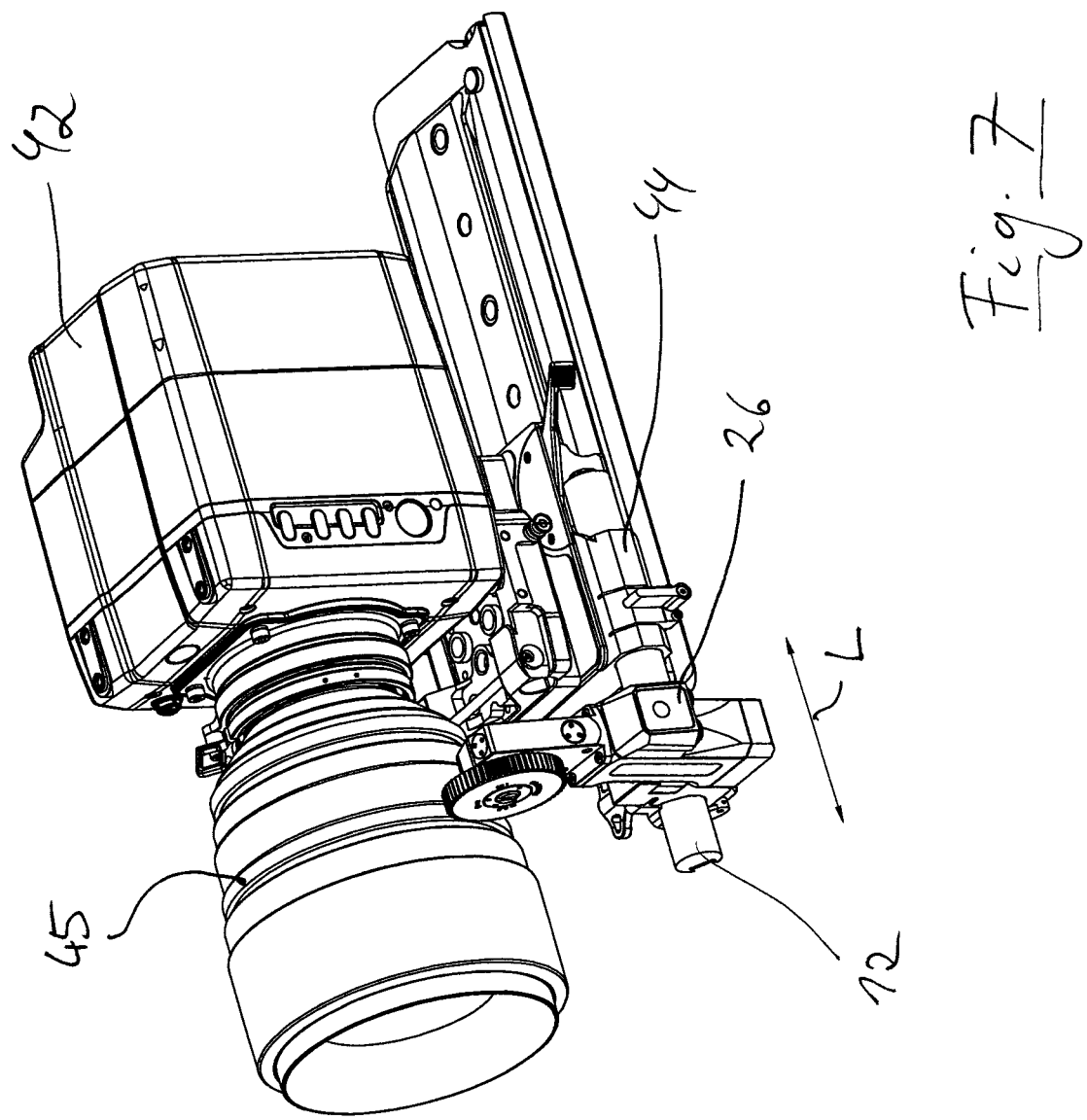
Figures 8A, 8B:
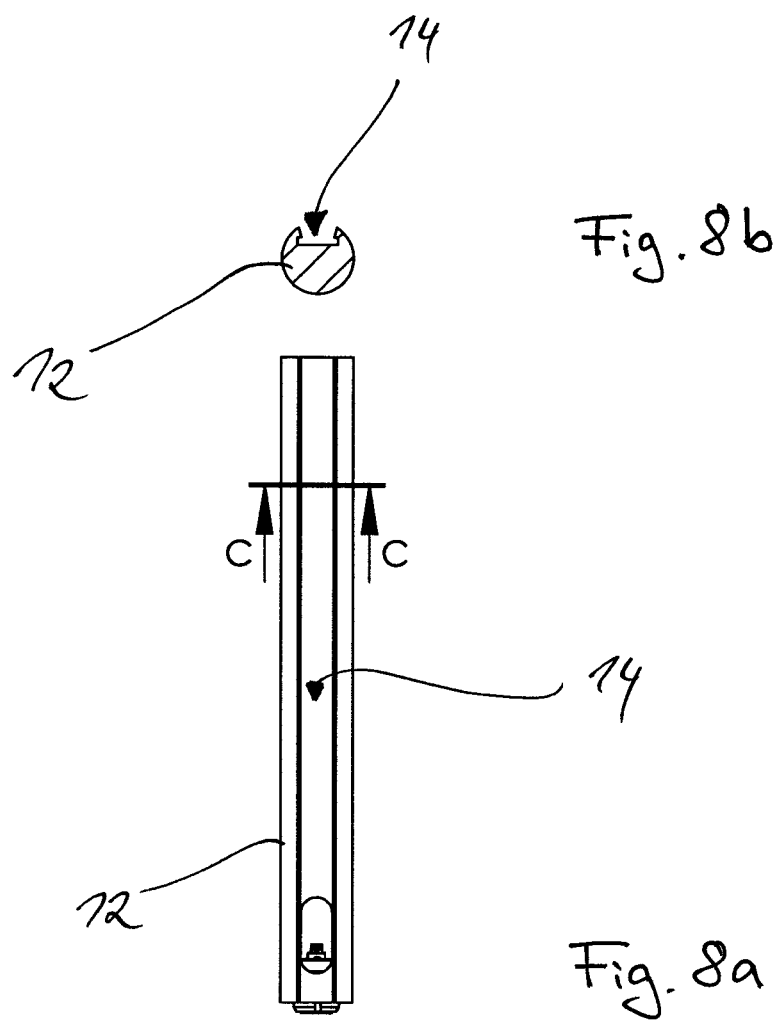
Figures 10A, 10B:
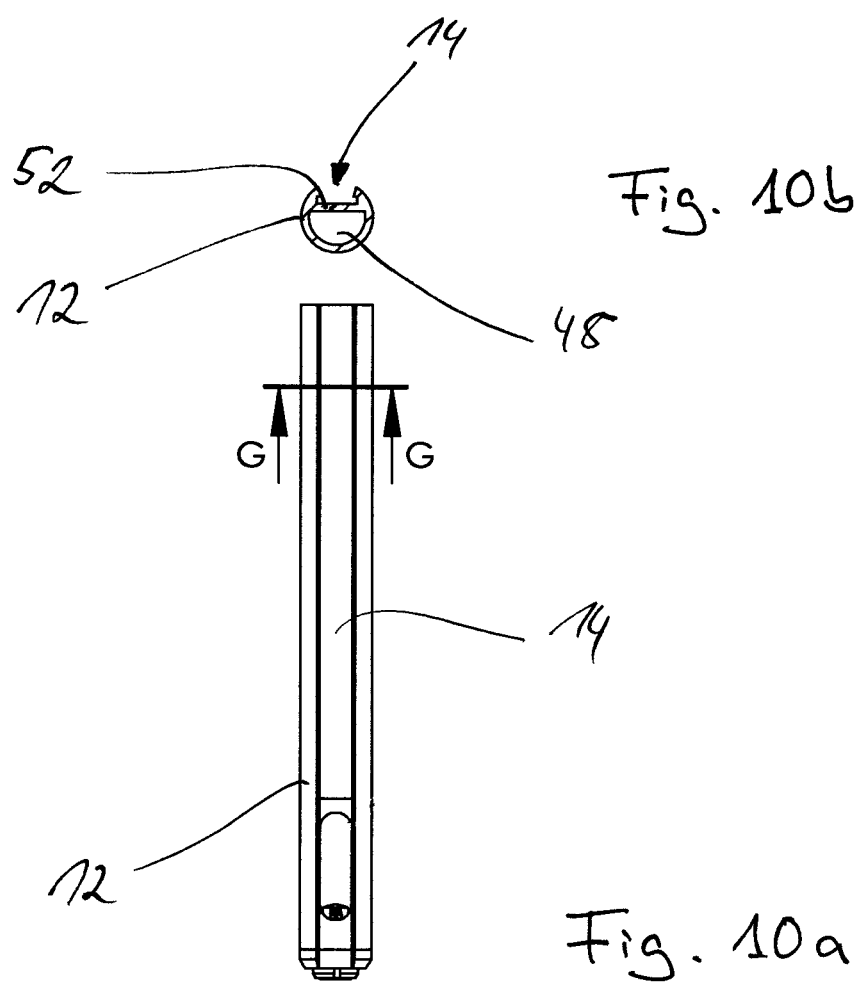
Figures 11A, 11B:
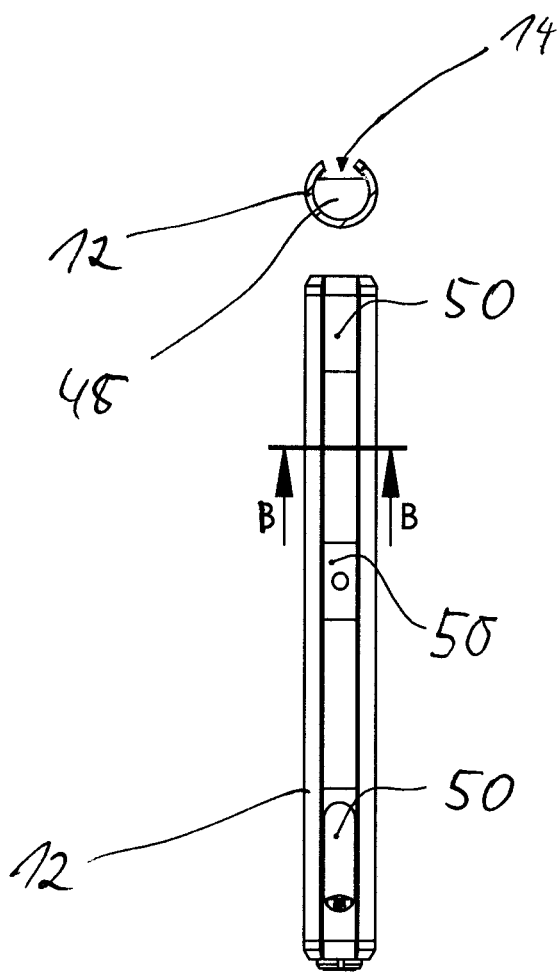
Figure 14:
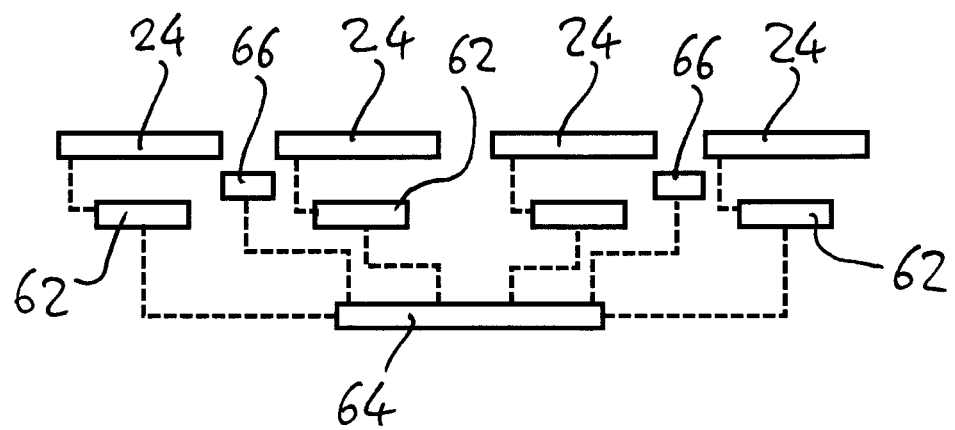

The invention will be explained only by way of example in the following with reference to the drawings. There are shown:

FIG. 1 a support rod for holding an accessory component relative to a motion picture camera (perspective view);

FIG. 2 the support rod of FIG. 1 and an accessory component that is not held by the support rod (frontal view);

FIG. 3 the support rod of FIG. 1 and the accessory component of FIG. 2 that is held by the support rod (perspective view);

FIG. 4 a motion picture camera having a fastening device, the support rod of FIG. 1, and an accessory component that is not held by the support rod (frontal view);

FIG. 5 the arrangement of FIG. 4, with the accessory component being held by the support rod;

FIG. 6 the arrangement of FIG. 5 in a side view;

FIG. 7 the arrangement of FIGS. 5 and 6 in a perspective view;

FIG. 8 a support rod for holding an accessory component relative to a motion picture camera without a contact board in a plan view (FIG. 8a) and in a cross-sectional view (FIG. 8b);

FIG. 9 a further support rod for holding an accessory component relative to a motion picture camera without a contact board in a plan view (FIG. 9a) and in a cross-sectional view (FIG. 9b);

FIG. 10 a further support rod for holding an accessory component relative to a motion picture camera without a contact board in a plan view (FIG. 10a) and in a cross-sectional view (FIG. 10b);

FIG. 11 a further support rod for holding an accessory component relative to a motion picture camera without a contact board in a plan view (FIG. 11a) and in a cross-sectional view (FIG. 11b);

FIG. 12 a further support rod for holding an accessory component relative to a motion picture camera without a contact board in a plan view (FIG. 12a) and in a cross-sectional view (FIG. 12b);

FIG. 13 plan views of four different contact boards (FIGS. 13a to 13d) for a support rod for holding an accessory component relative to a motion picture camera; and FIG. 14 a block diagram of an interconnection of a plurality of contact sections.

Figure 15A:
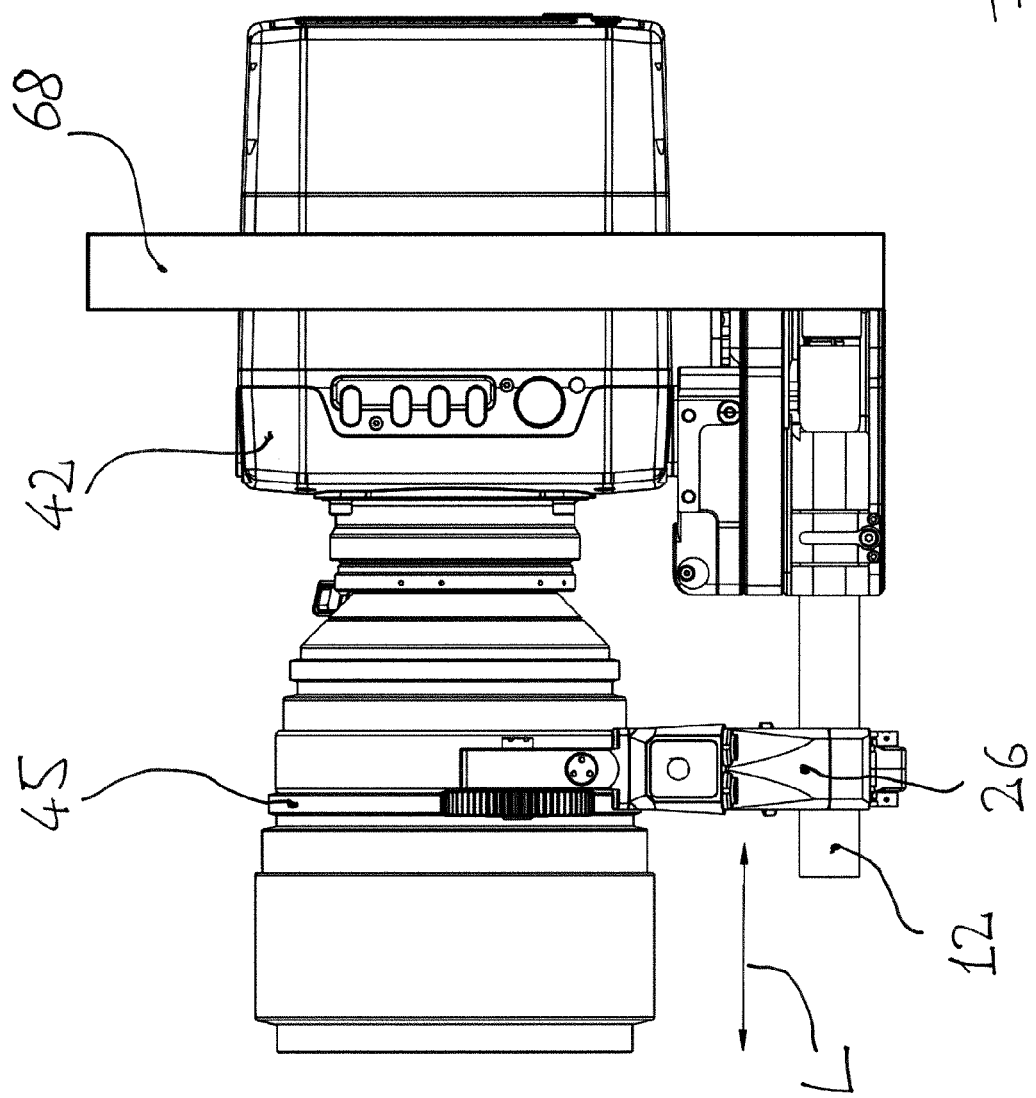
Figure 15B:
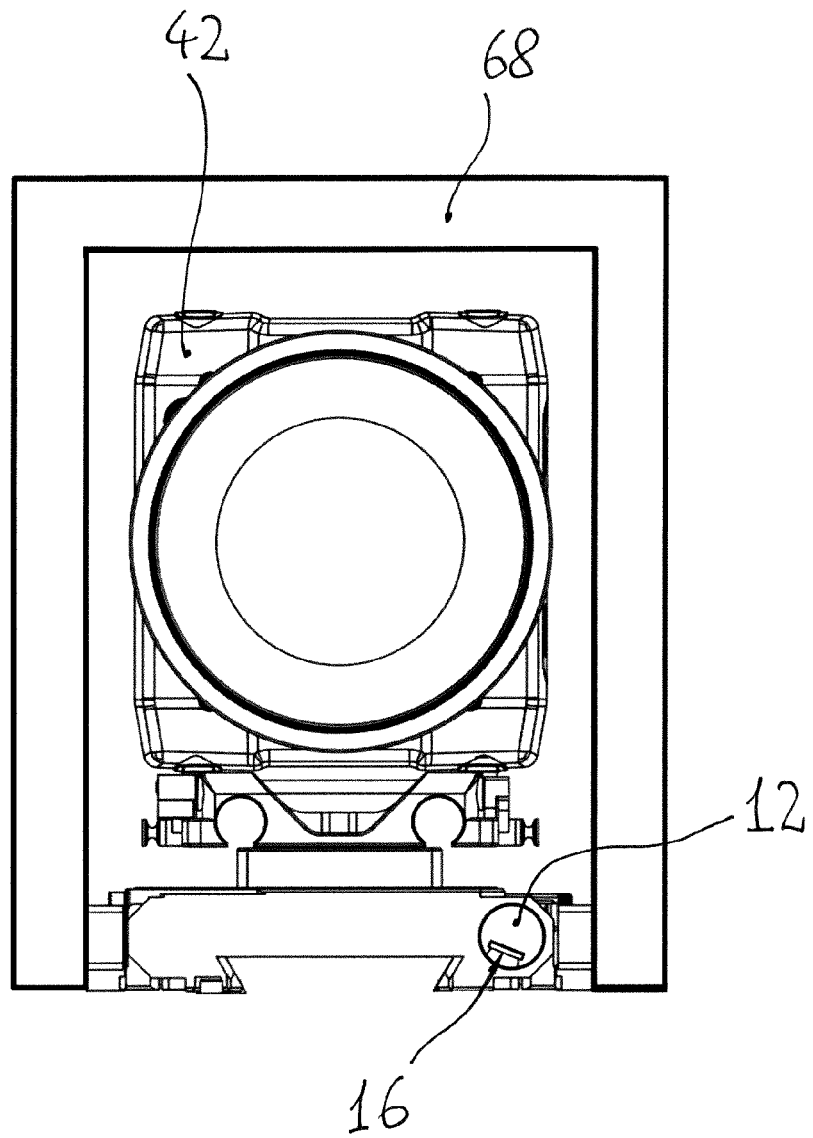

FIGS. 15A and 15B show, analog to the arrangement of FIG. 6 and FIG. 4, respectively, a cage 68 that surrounds the motion picture camera 42 and to which the support rod 12 is fastened.

Parts that are the same and similar are provided with the same reference numerals in the Figures.

FIG. 1 shows a support rod 12 for holding an accessory component relative to a motion picture camera in a variable position along a longitudinal axis L of the support rod 12, wherein the support rod 12 has an outwardly open recess 14, and wherein the support rod 12 has a set back contact region 16 in the recess 14 that is accessible from the outside for the electrical contacting of the accessory component as will be explained more exactly in the following.

A contact board 18 is arranged in the recess 14, with the contact region 16 being formed at the upper side of the contact board 18 accessible from the outside. Four contact tracks 22 extend in parallel with the longitudinal axis L on the upper side of the contact board 18 that are arranged adjacent to one another and that are divided into contact sections 24 in a regular pattern along the longitudinal axis L. Both the contact tracks 22 and the contact sections 24 are each electrically insulated from one another. Individual contact tracks 22 or contact sections 24 can, however, in particular be electrically connected to one another in the operating case or on a corresponding activation. The support rod 12 is provided at a front side with an electrical interface in the form of an electromechanical terminal prolongation 20, wherein the support rod 12 can be mechanically and electrically connected via the terminal prolongation 20 to a further support rod 12 or to a fastening device (not shown in FIG. 1).

The recess 14 extends with a constant cross-section in the longitudinal direction L, with the recess 14 having two lateral and oppositely disposed undercuts 56, whereby two lateral and likewise oppositely disposed grooves 58 are formed. As a result, the recess 14 can be called a T groove. The contact board 18 engages laterally into the grooves 58 so that the contact board 18 is captured in the recess 14. The contact board 18 only has to be pushed into the recess 14 to manufacture the support rod 12. The recess is bounded by side surfaces 19 along the longitudinal axis L that are inclined relative to the plane of extent of the contact board 18 and that face outwardly.

FIG. 2 shows the support rod 12 of FIG. 1 in a frontal view, in a view of the front side of the support rod 12, with the contact region accessible from the outside substantially facing downward. FIG. 2 further shows an accessory component 26 that is held by the support rod 12 and that should be installed at the support rod 12 for this purpose. The accessory component 26 has a clip 28 as the fastening device for this purpose, with a pivot arm 30 of the clip 28 being open in FIG. 2 to enable a reception of the support rod 12 in the clip 28. A current collector 34 that is electrically connected to the accessory component 26 by means of flexible lines 36 and 38 is fastened to the curved inner side of a section 35 of the clip 28 fixedly connected to the accessory component 26. The clip 28 further has a latching element 32 in the form of a T screw to secure the pivot arm 30 in a latched position after the support rod 12 is received in the clip 28. The accessory component 26 is by way of example an electric motor by which an adjustment ring of an objective of a motion picture camera can be electrically adjusted via a drive wheel 40 as will be explained more exactly in the following.

FIG. 3 shows the arrangement of FIG. 2 in a perspective view, with the accessory component 26 being installed at the support rod 12, i.e. the support rod 12 is sectionally peripherally received in the clip 28, with the pivot arm 30 being held in a latched position by the latching element 32 in which the accessory component 26 is fastened to the support rod 12 by a clamped fit. The accessory component 26 is installed at the support rod 12 such that the current collector 34 engages into the recess 14 of the support rod 12 and electrically contacts the contact region 16 located in the recess 14. The accessory component 26 can now be electrically supplied via the contact region 16.

As can likewise be recognized in FIG. 3, the pivot arm 30 is shaped in fork form, with the line 36 being led through the pivot arm 30. The pivot arm 30 can thus be pivoted independently of the line 36. Due to the continuous recess 14 in the longitudinal direction of the support rod 12, the accessory component 26 can be selectively installed in any desired position along the longitudinal axis L and can always be electrically supplied.

FIG. 4 shows, analog to the arrangement of FIG. 2, the support rod 12 and an accessory component 26 in a frontal view. Differing from FIG. 2, the support rod 12 is installed at a fastening device 44 that supports a motion picture camera 42 and is formed as a fastening bridge (a so-called bridge plate). The fastening device 44 is configured to hold two support rods 12 in parallel with one another. The fastening device 44 and the support rods 12 can here be parts of a support system of the motion picture camera 41.

The support rod 12 is installed at the fastening device 44 such that the contact region 16 of the recess 14 faces obliquely downward. The risk of unwanted contacting of the contact region 16 is hereby minimized.

In FIG. 5, the arrangement of FIG. 4 is shown in a state in which the accessory component 26 is now installed at the support rod 12 in an analog manner to FIG. 3. In the installed state, the accessory component 26 is rotationally effectively coupled via the drive wheel 40 to an adjustment ring 45 of an objective of the motion picture camera 42 (covered in FIG. 5; cf., however, the side view or perspective view in accordance with FIGS. 6 and 7 respectively. The accessory component 26 can be supplied with electrical energy and/or with signal data via the contact region 16 so that the accessory component 26 can automatically rotate the adjustment ring 45 into a desired position.

Exemplary embodiments of the support rod 12 are shown in FIGS. 8 to 12, with the respective contact board 18, that is to be arranged in the recess 14 in the embodiments in accordance with FIGS. 8 to 12, not being shown in FIGS. 8 to 12. A separate and/or releasable contact board 18 does not necessarily have to be provided, however. The contact region 16 can generally also be integrally formed at the support rod 12.

The support rod 12 is shown in a plan view with respect to the recess 14 in FIG. 8a. FIG. 8b shows a cross-sectional view of the support rod 12 along the section plane C-C entered in FIG. 8a. As results from FIG. 8b, the support rod 12 is a substantially solid rod.

The support rod 12 shown in FIG. 9a (plan view) and in FIG. 9b (cross-sectional view along the section plane A-A of FIG. 9a) differs from the support rod 12 shown in FIG. 8 in that a plurality of cut-outs 46 are provided that are distributed in the longitudinal direction in the region of the recess 14 and that can e.g. be manufactured by milling in a simple manner. The weight of the support rod 12 can hereby be reduced, with the stability of the support rod 12 being hardly reduced or only being slightly reduced due to webs 49 remaining between two adjacent cut-outs 46.

The support rod 12 of FIG. 10a (plan view) and FIG. 10b cross-sectional view along the section plane G-G of FIG. 10a) is characterized by a hollow space 48 that is substantially continuous in the longitudinal direction and that can e.g. be manufactured by an extrusion process and reduces the weight of the support rod 12 even further with respect to the embodiment of FIG. 9. An integral base 52 is provided between the recess 14 and the hollow space 48 through which in particular the mechanical stability of the support rod 12 is substantially maintained.

The support rod 12 of FIG. 11a (plan view) and FIG. 11b (cross-sectional view along the section plane B-B of FIG. 11) is a slit (hollow) tube. The mechanical stability of the support rod 12 can in this case be ensured by inserts 50 that are e.g. formed from plastic and that are inserted at regular intervals along the longitudinal axis L into the substantially continuous hollow space 48 of the support rod 12. The inserts 50 further serve as support layers for the contact board 18 (not shown in FIGS. 11a and 11b).

The support rod 12 of FIG. 12a (plan view) and FIG. 12 (cross-sectional view along the section plane J-J of FIG. 12a) corresponds to the support rod 12 of FIG. 8, with a further recess 14 additionally being provided. The two recesses 14 are arranged diametrically opposite and respectively serve for receiving a contact board 18. Alternatively, the respective contact regions 16 in the respective recess 14 are also integrally formed with the support rod 12. Contact regions 16 of different polarities can in particular be provided in the two recesses 14.

Four exemplary embodiments for the contact region 16 of the contact board 18 are shown in FIG. 13. Four contact tracks 22 that are in parallel in the longitudinal direction are each divided into contact sections 24 with respective identical patterns in the longitudinal direction. This corresponds to the case of the contact board of FIG. 1. Two contact tracks 22 are formed as continuous, i.e. not divided, in FIG. 13b. Two further contact tracks 22 are as a rule divided into contact sections 24. In the contact region 16 of FIG. 13c, deviating from that of FIG. 13b, three of the four contact tracks 27 are formed as continuous. All the contact tracks 22 are continuous in FIG. 13d. The contact regions 16 of FIGS. 13a to 13b do not have to be formed at the contact board 18. They can also be formed directly at the support rod 12, in particular integrally in the recess.

The position of an accessory component 26 installed at the support rod 12 can be determined by means of a sensor system, not shown, to release at least one contact track 22 or one contact section 24 that electrically contacts the current collector 34 of the accessory component 26 with the aid of a respective switching device, not shown. In this manner, the electric connection of the accessory component 26 can take fully automatically and particularly safely, with the risk of an electric short circuit being reduced to a minimum. A laborious connection of the accessory component via cables is no longer necessary.

For this purpose, the respective contact section 24 of a respective contact track 22 can, for example, be selectively switched electrically active (via respective vias of the contact board 18), wherein said switching devices and corresponding control lines as well as one or more supply lines can be provided for a constant potential supply and/or for a signal transmission (not visible in the plan view in accordance with FIGS. 13a to 13b) at the lower side of the contact region 16. Said sensor system can comprise a plurality of sensors (e.g. reed switches) that can likewise be arranged at the contact region 16 or at the contact board 18, with a respective sensor being able to be provided for a respective number of contact sections 24 in the longitudinal direction of the contact region 16 (e.g. one, two, three, or four contact sections 24). An associated control circuit (not shown) can also be provided at the contact region 16 or at another section of the support rod 12, for example in a central section or at a longitudinal end of the contact region 16, at the upper side or at the lower side to control said switching devices.

FIG. 14 illustrates a possible interconnection of such an arrangement in a block diagram. Four contact sections 24 are shown that are arranged behind one another, with further contact sections 24 or contact tracks 22 being able to be provided in parallel herewith. Each contact section 24 is connected to a respective switching device 62, with the switching devices 52 being controlled by a common control circuit 64. A sensor 66 is arranged between two respective adjacent contact sections 24. As soon as one of the sensors 66 detects the presence of an accessory component 26 (cf. FIGS. 2 to 7), the sensor 66 transmits a corresponding report signal to the control circuit 64. The control circuit 64 switches the two contact sections 24 adjacent the sensor 66 electrically active via the respective switching devices 62 in response to such a report signal to enable an energy supply of the accessory component 26 and/or a signal transmission from and/or to the accessory component 26 via said contact sections.

REFERENCE NUMERAL LIST

12 support rod
14 recess
16 contact region
18 contact board
19 side surface
20 terminal prolongation
22 contact track
24 contact section
26 accessory component
28 clip
30 pivot arm
32 latching element
34 current collector
35 section
36 line
38 line
40 drive wheel
42 motion picture camera
44 fastening device
45 adjustment ring
46 cut-out
48 hollow space
49 web
50 insert
52 base
56 undercut
58 groove
62 switching device
64 control circuit
66 sensor
L longitudinal axis

The invention claimed is:
1. A support system comprising:
  at least two support rods each configured to hold an accessory component relative to a motion picture camera in a variable position along a longitudinal axis of the support rod, at least one of the at least two support rods comprising:
   an outer surface at a maximum radius of the at least one support rod with respect to the longitudinal axis;
   a recess that extends from the outer surface radially inwardly with respect to the longitudinal axis, the recess being formed by two sidewalls and a bottom portion between the two side walls, the sidewalls extending radially inwardly toward the bottom por- tion and connecting the bottom portion of the recess to the outer surface of the at least one support rod;

at least one electrical contact track disposed within the bottom portion of the recess so that the at least one electrical contact track has an exposed surface that is accessible for electrical contact with the accessory component, the exposed surface having a normal vector that extends in a radial direction relative to the at least one support rod; and a fastening device that fastens the at least two support rods to the motion picture camera.

2. The support system in accordance with claim 1, wherein the at least one support rod (12) is formed by a solid rod, by a hollow tube or by a tube, the support rod (12) having an internal structure at which the recess (14) is formed.

3. The support system in accordance with claim 1, wherein the at least one support rod (12) has an at least substantially circular cross-section that is at least sectionally constant long the longitudinal axis (L).

4. The support system in accordance with claim 1, wherein the recess (14) is elongate and extends along the longitudinal axis (L) of the at least one support rod (12).

5. The support system in accordance with claim 1, wherein the recess (14) is formed by a substantially T-shaped groove.

6. The support system in accordance with claim 1, wherein the at least one support rod (12) has two outwardly open recesses (14) at different peripheral sections; and wherein the at least one support rod (12) has at least one electrical contact track at the bottom portion of each of the two recesses (14) that is accessible from the outside for the electrical contacting of the accessory component (26).

7. The support system in accordance with claim 1, wherein at least one contact board (18) at which the at least one electrical contact track is formed is arranged in the recess (14).

8. The support system in accordance with claim 7, wherein the recess (14) has at least one undercut (56) at least sectionally along the longitudinal axis (L) of the at least one support rod (12), with the contact board (18) being captured between a base (52) of the recess and the undercut (56).

9. The support system in accordance with claim 7, wherein the recess (14) is bounded along the longitudinal axis (L) of the at least one support rod (12) by side surfaces (19) that are inclined relative to the plane of extent of the contact board (18) and face outwardly.

10. The support system in accordance with claim 1, wherein the at least one support rod (12) is at least sectionally hollow beneath a base (52) of the recess (14).

11. The support system in accordance with claim 1, wherein the at least one electrical contact track comprises a plurality of mutually adjacent contact tracks (22) that extend along the longitudinal axis (L) of the at least one support rod (12) and are electrically insulated from one another.

12. The support system in accordance with claim 1, wherein the at least one electrical contact track is divided along the longitudinal axis (L) into a plurality of contact sections (24) that are electrically insulated from one another.

13. The support system in accordance with claim 12, wherein the at least one support rod (12) has at least one electrical bus line that extends continuously along the plurality of contact sections (24) and that is configured to supply the plurality of contact sections (24) with electrical energy and/or to transmit electrical signals from and to the plurality of contact sections (24).

14. The support system in accordance with claim 1, wherein the at least one support rod (12) comprises a sensor system for detecting at least one of a presence, a position and an identification feature of an accessory component (26) held by the support rod (12).

15. The support system in accordance with claim 14, wherein the sensor system has at least one sensor (66) that comprises at least one of
a Hall sensor;
a reed switch
an electric contact switch;
a mechanical contact switch; and
a radio frequency receiver.

16. The support system in accordance with claim 14, wherein the at least one electrical contact track is divided along the longitudinal axis (L) of the at least one support rod (12) into a plurality of contact sections (24) that are electrically insulated from one another; and wherein the at least one support rod (12) has at least one control circuit (64) that is configured to selectively activate at least one of the plurality of contact sections (24) for at least one of an electrical energy supply of the accessory component (26) and an electrical signal transmission from or to the accessory component (26) in dependence on at least one of the detected presence, the detected position and the detected identification feature of the accessory component (26) held by the at least one support rod (12).

17. The support system in accordance with claim 1, wherein the at least one support rod (12) has at least one electrical interface (20) that is configured to connect the at least one electrical contact track to at least one of an electrical energy source and an external communication device.

18. The support system in accordance with claim 1, wherein the at least one electrical contact track (22) forms a first electrical terminal for an electrical energy supply of the accessory component (26) and/or for an electrical signal transmission from or to the accessory component (26).

19. The support system in accordance with claim 18, wherein the at least one support rod (12) is electrically conductive, with the at least one support rod (12) forming a second electrical terminal for the electrical supply of the accessory component (26) and/or for the electrical signal transmission from or to the accessory component (26).

20. The support system in accordance with claim 18, wherein the at least one electrical contact track (22) is divided along the longitudinal axis (L) of the at least one support rod (12) into a plurality of contact sections (24) that are electrically insulated from one another.

21. The support system in accordance with claim 1, wherein the at least one electrical contact track comprises at least one first contact track (22) and one second contact track (22) that extend along the longitudinal axis (L) of the at least one support rod (12), with the second contact track (22) extending next to the first contact track (22) and with the first contact track (22) forming a first electrical terminal and the second contact track (22) forming a second electrical terminal for an electrical energy supply of the accessory component (26) and/or for an electrical signal transmission from or to the accessory component (26).

22. The support system in accordance with claim 21, wherein at least one of the first contact track (22) and the second contact track (22) is divided along the longitudinal axis (L) of the at least one support rod (12) into a plurality of contact sections (24) that are electrically insulated from one another.

23. The support system in accordance with claim 1, wherein the at least one support rod (12) has a first recess (14) having a first contact region (16) at a first peripheral region of the at least one support rod (12) and a second recess (14) having a second contact region (16) at a second peripheral region of the at least one support rod (12), with the first contact region (16) forming a first electrical terminal and the second contact region (16) forming a second electrical terminal for an electrical energy supply of the accessory component (26) and/or for an electrical signal transmission from or to the accessory component (26).

24. The support system in accordance with claim 23, wherein at least one of the first contact region (16) and the second contact region (16) is divided along the longitudinal axis (L) of the at least one support rod (12) into a plurality of contact sections (24) that are electrically insulated from one another.

25. The support system in accordance with claim 1, wherein the at least one support rod (12) has a plurality of recesses (14) along its longitudinal axis (L), with the at least one support rod (12) having a respective contact region (16) in each of the plurality of recesses (14), and with the respective contact region (16) comprising a contact track (22) or at least two contact tracks (22) extending next to one another.

26. The support system in accordance with claim 1, wherein the at least one of the at least two support rods comprises two support rods wherein the at least one electrical contact track of a first one of the two support rods (12) comprises a first contact track (22) that extends along the longitudinal axis (L) of the first support rod (12) and that forms a first electrical terminal for an electrical energy supply of the accessory component (26) and/or for an electrical signal transmission from or to the accessory component (26), and wherein the at least one electrical contact track of the second one of the two support rods (12) comprises a second contact track (22) that extends along the longitudinal axis (L) of the second support rod (12) and that forms a second electrical terminal for the electrical energy supply of the accessory component (26) and/or for the electrical signal transmission from or to the accessory component (26).

27. The support system of claim 1, wherein the fastening device is a fastening plate.

28. The support system of claim 1, wherein the fastening device is integral to the motion picture camera.

29. The support system of claim 1, wherein the fastening device holds the at least two support rods in parallel with one another.

30. The support system of claim 1, wherein the at least two support rods axially extend through the fastening device.

31. A setting motor for an objective ring of a motion picture camera (42) having a fastener that is configured to fasten the setting motor in a variable position along a longitudinal axis (L) of a support rod (12), and having an electrical current collector (34) that is configured to engage into a recess (14) of the support rod (12) to electrically contact an exposed surface of an electrical contact track located in the recess (14), wherein an outer surface of the support rod is at a maximum radius of the support rod with respect to the longitudinal axis, the recess extends from the outer surface radially inwardly with respect to the longitudinal axis, the recess is formed by two sidewalls and a bottom portion between the two side walls, the sidewalls extend radially inwardly toward the bottom portion and connect the bottom portion of the recess to the outer surface of the support rod, and the electrical contact track is disposed within the bottom portion of the recess so that the exposed surface of the electrical contact track is accessible for electrical contact with the accessory component, and the exposed surface has a normal vector that extends in a radial direction relative to the support rod.

32. A support system comprising:
a support rod configured to hold an accessory component relative to a motion picture camera in a variable position along a longitudinal axis of the support rod, the support rod comprising:
an outer surface at a maximum radius of the support rod with respect to the longitudinal axis;
a recess that extends from the outer surface radially inwardly with respect to the longitudinal axis, the recess being formed by two sidewalls and a bottom portion between the two side walls, the sidewalls extending radially inwardly toward the bottom portion and connecting the bottom portion of the recess to the outer surface of the support rod;
at least one electrical contact track disposed within the bottom portion of the recess so that the at least one electrical contact track has an exposed surface that is accessible for electrical contact with the accessory component,
the exposed surface having a normal vector that extends in a radial direction relative to the support rod; and
a cage configured to surround the motion picture camera, the support rod being fastened to the cage.

* * * * *